United States Patent
Mumtaz

(10) Patent No.: US 9,379,639 B2
(45) Date of Patent: Jun. 28, 2016

(54) INVERTER SYSTEM ENABLING SELF-CONFIGURATION

(71) Applicant: SolarCity Corporation, San Mateo, CA (US)

(72) Inventor: Asim Mumtaz, Cambridge (GB)

(73) Assignee: SOLARCITY CORPORATION, San Mateo, CA (US)

( * ) Notice: Subject to any disclaimer, the term of this patent is extended or adjusted under 35 U.S.C. 154(b) by 260 days.

(21) Appl. No.: 14/142,693

(22) Filed: Dec. 27, 2013

(65) Prior Publication Data
US 2014/0265579 A1 Sep. 18, 2014

Related U.S. Application Data

(60) Provisional application No. 61/749,251, filed on Jan. 4, 2013.

(51) Int. Cl.
| | |
|---|---|
| H02M 7/42 | (2006.01) |
| H02J 3/38 | (2006.01) |
| H02J 3/00 | (2006.01) |
| H02J 3/40 | (2006.01) |
| H02J 13/00 | (2006.01) |

(52) U.S. Cl.
CPC .............. *H02M 7/42* (2013.01); *H02J 3/383* (2013.01); *H02J 3/386* (2013.01); *H02J 3/40* (2013.01); *H02J 13/0006* (2013.01); *Y02E 10/563* (2013.01); *Y02E 10/763* (2013.01); *Y02E 40/72* (2013.01); *Y04S 10/123* (2013.01); *Y10T 307/50* (2015.04)

(58) Field of Classification Search
CPC ........................................................ H02J 3/00
USPC ............................................................ 307/82
See application file for complete search history.

(56) References Cited

U.S. PATENT DOCUMENTS

| | | | |
|---|---|---|---|
| 2008/0294472 | A1 | 11/2008 | Yamada |
| 2011/0282600 | A1 | 11/2011 | Roesner et al. |
| 2012/0065803 | A1 | 3/2012 | Teichmann et al. |
| 2012/0133208 | A1 | 5/2012 | Kalhoff et al. |
| 2012/0154162 | A1 | 6/2012 | Vandevelde et al. |
| 2014/0191583 | A1 | 7/2014 | Chisenga et al. |

FOREIGN PATENT DOCUMENTS

| | | |
|---|---|---|
| EP | 2485361 | 8/2012 |
| WO | WO 2014/001756 | 1/2014 |
| WO | WO2014/106744 | 7/2014 |

OTHER PUBLICATIONS

Invitation to Pay Additional Fees and Partial Search Report for PCT/GB2014/050004, Jun. 27, 2014 (mailing date), Enecsys Limited.

(Continued)

*Primary Examiner* — Robert Deberadinis
(74) *Attorney, Agent, or Firm* — Kilpatrick Townsend & Stockton LLP

(57) ABSTRACT

A method of configuring an installed energy harvesting device to comply with a local grid connection standard is provided. The method identifies a local grid connection standard for an energy harvesting device that has been installed in a physical installation. The method then configures the energy harvesting device to apply the identified grid connection standard. To identify the local gird connection standard, the method determines a physical location for the installation of the energy harvesting device. The method then identifies the local grid connection standard based on the determined physical location.

29 Claims, 13 Drawing Sheets

(56) References Cited

OTHER PUBLICATIONS

International Search Report of PCT/GB2013/051529, Feb. 20, 2014 (mailing date), Enecsys Limited.

Marra, Enes Gonçalves, et al., "Self-Excited Induction Generator Controlled by a VS-PWM Converter Providing High Power-Factor Current to a Single-Phase Grid," Proceedings of the $24^{th}$ Annual Conference of IEEE, Aug. 31-Sep. 4, 1998, pp. 703-708, vol. 2, IEEE, Aachen, Germany.

| Grid Connection Standard | |
|---|---|
| Voltage | 1210 |
| Voltage limits (range) | 1215 |
| Voltage unbalance | 1220 |
| Voltage swell | 1225 |
| Voltage sag | 1230 |
| Voltage fluctuation (Flicker) | 1235 |
| Transient overvoltage (Impulse) | 1240 |
| Harmonics | 1245 |
| Inter-harmonics | 1250 |
| High-order harmonic component | 1255 |
| Frequency | 1260 |
| Frequency fluctuation | 1265 |
| Electrical noise | 1270 |
| Interruption | 1275 |
| Inrush current | 1280 |
| DC current injection | 1285 |
| Disconnection time | 1290 |
| Reconnection time | 1291 |
| Power factor | 1292 |
| PFC | |

*FIG. 12*

INVERTER SYSTEM ENABLING SELF-CONFIGURATION

CLAIM OF BENEFIT TO PRIOR APPLICATIONS

This present Application claims the benefit of U.S. Provisional Patent Application 61/749,251 filed Jan. 4, 2013. U.S. Provisional Patent Application 61/749,251 is incorporated herein by reference.

BACKGROUND

Many micropower generation systems, such as those in the home, typically include one or more of a number of solar cells, wind turbines, combined heat and power systems and other similar systems. The micropower generation systems generate electricity. The generated electricity is converted into useable voltage and current suitable for local consumption, for example 240V at 50 Hz or 110V at 60 Hz. However, these micropower generation systems often generate more power than is actually needed for local consumption. If the micropower generation systems were connected to the alternating current (AC) gird, from which power is normally drawn, this surplus power could be sent back to the AC grid.

Micropower generation systems often include inverters that are used to generate an AC output from a direct current (DC) input. The inverters are generally located within the proximity of the power source (solar cells, wind turbine, etc.) and connected to the AC grid mains remotely. Among various inverters, a solar inverter converts the variable DC output of a photovoltaic (PV) solar panel into a utility frequency AC that can be fed into a commercial electrical grid or used by a local, off-grid electrical network.

In recent years there has been a re-emergence of interest in module-integrated electronics. The solar micro-inverter in particular has been noted as a product that has a number of benefits over the existing conventional solutions. A solar micro-inverter converts DC electricity from a single solar panel to AC. The electric power from several micro-inverters is combined and fed into an existing electrical grid. Unlike conventional string inverter devices, each micro-inverter is connected to a single solar panel rather than multiple solar panels.

The benefits of an energy harvesting system based on micro-inverters include: improved energy harvest over the life of the installation, particularly in scenarios of shading or other causes of mismatch in solar PV installations; and low voltage DC (less than 80V from a single panel), which is safer and significantly reduces arcing faults. Additional benefits of an energy harvesting system based on micro-inverters also include the ability to pinpoint failures or problems with solar panels (or solar modules), and the scalability by adding panels to an installation. The installation process itself is also extremely easy and can be considered as a plug and play method. Solar micro-inverters enable true plug and play installation of solar PV modules. The ease with which these can be installed is a major selling point for the solar industry. In the discussion that follows, the term "inverter" is used to describe all electrical power converters that change DC to AC, including string inverters and micro-inverters.

Because the inverters are fed into an existing electrical grid, they have to conform to the grid connection standard used by the local electrical grid. For example, the inverters must synchronize with the frequency of the electrical grid, the AC current produced by the inverters must be within the required voltage range of the grid, and so on. Different countries have different utility requirements. As a result, inverters manufactured for different countries must be configured differently in order to function properly.

Currently, the inverters are configured in the factory, where they are manufactured and labeled. This adds an extra step in the manufacturing process. Moreover, once the inverters are manufactured and configured, they have to be managed separately for different countries or different grid connection standards. The manufactured inverters usually do not go immediately from the factory to the end customer. They are usually stored in several warehouses in different regions around the world, waiting to be ordered and distributed. FIG. 1 conceptually illustrates the current approach of manufacturing and distributing inverters to different countries by configuring inverters at the factory. As shown in the figure, a factory 105 manufactures and configures different inverters based on different grid connection standards for different countries. The configured inverters are stored in two warehouses 110 and 115, and distributed to five different countries, i.e., country 1-5.

The factory 105 produces and configures the inverters 1-5, each of which is configured to comply with a particular grid connection standard of a particular country. For example, the inverter 1 is configured to comply with the grid connection standard of country 1, the inverter 2 is configured to comply with the grid connection standard of country 2, and so on. Once the inverters are produced and configured in the factory 105, they are stored in warehouses 110 and 115. A warehouse stores several different kinds of inverters. Each kind of inverter is configured for the grid connection standard of a particular country. For example, warehouse 110 stores three different kinds of inverters, i.e., inverter 1-3 for country 1-3. The warehouse 115 stores three different kinds of inverters, i.e., inverter 3-5 for country 3-5. Inverters with the same configuration may be stored in different warehouses. For instance, inverter 3 is stored in both warehouses 110 and 115. The different kinds of inverters are distributed to their corresponding countries when ordered by customers. For example, inverter 1 is distributed to country 1; inverter 2 is distributed to country 2, and so on. Because the same kind of inverters may be stored in different warehouses, a country may receive inverters configured to comply with its grid connection standard from multiple warehouses. For instance, country 3 receives inverter 3 from both warehouses 110 and 115.

As illustrated in FIG. 1, in order to ensure sufficient supply for each country and each grid connection standard, the warehouses must carry a lot of different stocks and treat different inverters differently based on demand forecasting and many other factors. When the manufacturer needs to supply inverters to many different countries or different grid connection standards, the management of the inventory and distribution of different inverters become very complicated.

SUMMARY

Some embodiments of the invention provide a method of configuring an installed energy harvesting device to comply with a local grid connection standard. The method identifies a local grid connection standard for an energy harvesting device that has been installed in a physical installation. The method then configures the energy harvesting device to apply the identified grid connection standard.

To identify the local gird connection standard, the method of some embodiments determines a physical location for the installation of the energy harvesting device. The method then identifies the local grid connection standard based on the determined physical location.

To determine the physical location of an installed energy harvesting device, the method of some embodiments utilizes a global positioning system (GPS) receiver equipped on the energy harvesting device. In some embodiments, the physical location for the installed energy harvesting device is determined by receiving a user input. In some embodiments, the method determines the physical location of the installed energy harvesting device by receiving the physical location from a communication gateway. Other embodiments determine the physical location of the installed energy harvesting device by receiving the physical location from a handheld installation device located near the physical installation.

In some embodiments, the handheld installation device determines the physical location of the installed energy harvesting device by using a GPS receiver equipped on the handheld device to identify the physical location of the handheld device. The physical location of the handheld installation device is then treated as the physical location of the installed energy harvesting device because they are located physically near each other. In some embodiments, the handheld installation device identifies the physical location of the installation by receiving a user input.

Instead of receiving a physical location of the installation, the method of some embodiments receives a local grid connection standard from a handheld installation device located near the physical installation of the energy harvesting device. The handheld installation device identifies the local grid connection standard based on the physical location of the installation. In some embodiments, the physical location of the installation is determined by receiving a user input on the handheld device. In other embodiments, the installation location is determined by receiving a GPS coordinate through a GPS receiver equipped on the handheld device.

The method of some embodiments receives the local grid connection standard from a communication gateway that connects the installed energy harvesting devices to a communication network. The communication gateway of some embodiments identifies the local grid connection standard based on a physical location of the communication gateway determined by a set of networking parameters of the communication network. The communication gateway then sends the identified grid connection standard to the installed energy harvesting device. In some embodiments, the set of networking parameters includes the Internet Protocol (IP) address of the communication gateway. The set of networking parameters of some embodiments includes the location of the nearest Wi-Fi access point or the location of the nearest cellular tower. In some embodiments, the local grid connection standard identified by the communication gateway is confirmed by a user input before being sent to the installed energy harvesting device.

In some embodiments, each energy-harvesting device includes an inverter for converting energy from photovoltaic modules into AC output. The energy harvesting device of some embodiments includes a power converter for converting DC power from a photovoltaic device to AC electricity and a controller for configuring the power converter based on a local grid connection standard after the energy harvesting device has been installed. The controller of some embodiments includes at least one processor. In some embodiments, the energy-harvesting device further includes a GPS receiver for determining the physical location of the installation. The controller then identifies the local grid connection standard based on the physical location determined by the GPS receiver.

In some embodiments, the controller of the energy harvesting device identifies the local grid connection standard through searching a data structure that contains information regarding all grid connection standards. Different embodiments store the data structure differently. In some embodiments, the data structure is stored on the energy harvesting device. In other embodiments, the data structure is stored on another device and is accessible to the controller through a communication network. The data structure of some embodiments is a grid connection standards lookup table. The grid connection standards lookup table contains all the grid connection standards and the corresponding geographic regions for each grid connection standard. In some embodiments, instead of identifying the grid connection standard by itself, the controller of the energy harvesting device receives the appropriate grid connection standard from a device outside of the energy harvesting device.

The energy harvesting device of some embodiments includes a communication module. In some embodiments, the controller of the energy harvesting device uses the communication module to communicate with other devices in a communication network. The energy harvesting device of some embodiments is equipped with communications devices such as wireless transceivers as part of the communication module. In some embodiments, instead of or in conjunction with using wireless communication, the communication module uses the power line to communicate with other devices in the communication network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 12 illustrates an example of a set of parameters included in a grid connection standard.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method of configuring an installed energy harvesting device to comply with a local grid connection standard. The method identifies a local grid connection standard for an energy harvesting device that has been installed in a physical installation. The method then configures the energy harvesting device to apply the identified grid connection standard.

To identify the local gird connection standard, some embodiments determine a physical location for the installation of the energy harvesting device. These embodiments then identify the local grid connection standard based on the determined physical location.

Figure 1:
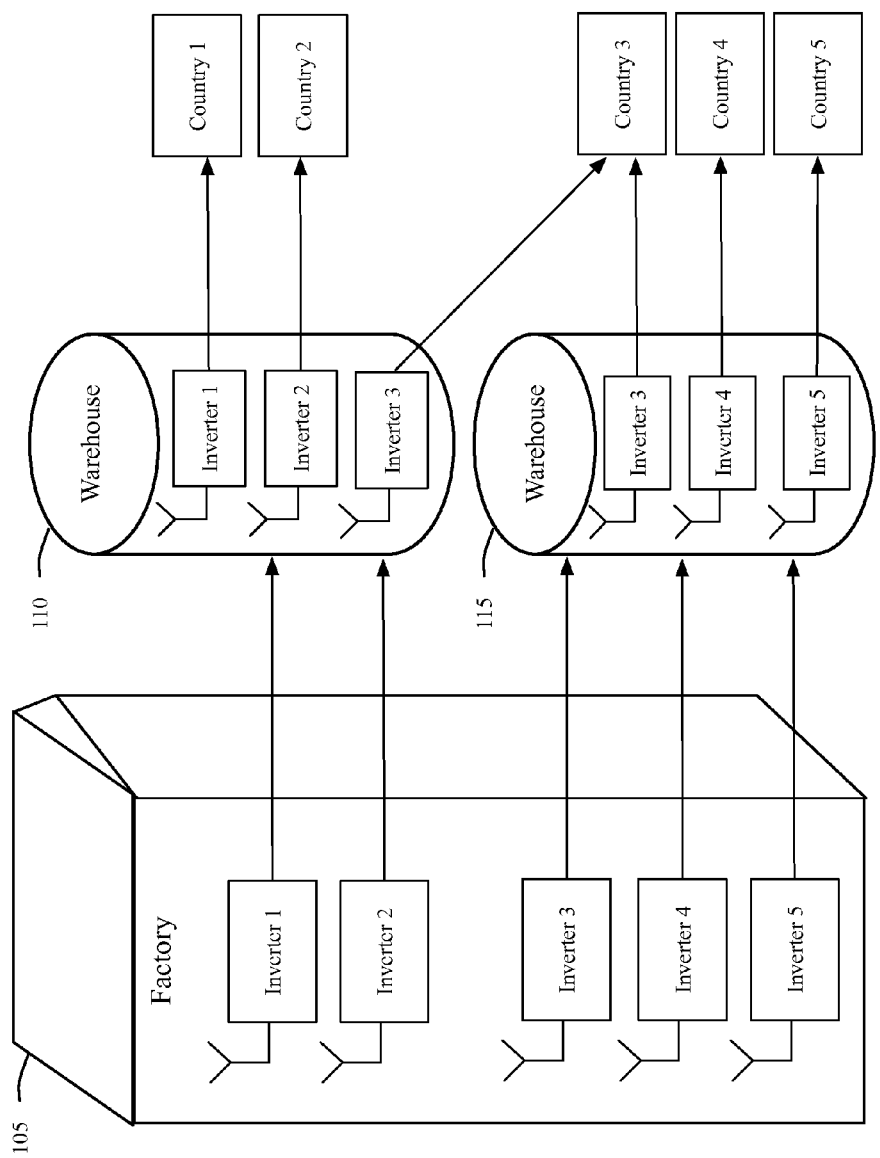
FIG. 1 conceptually illustrates the current approach of manufacturing and distributing inverters to different countries by configuring inverters at the factory.
Figure 2:
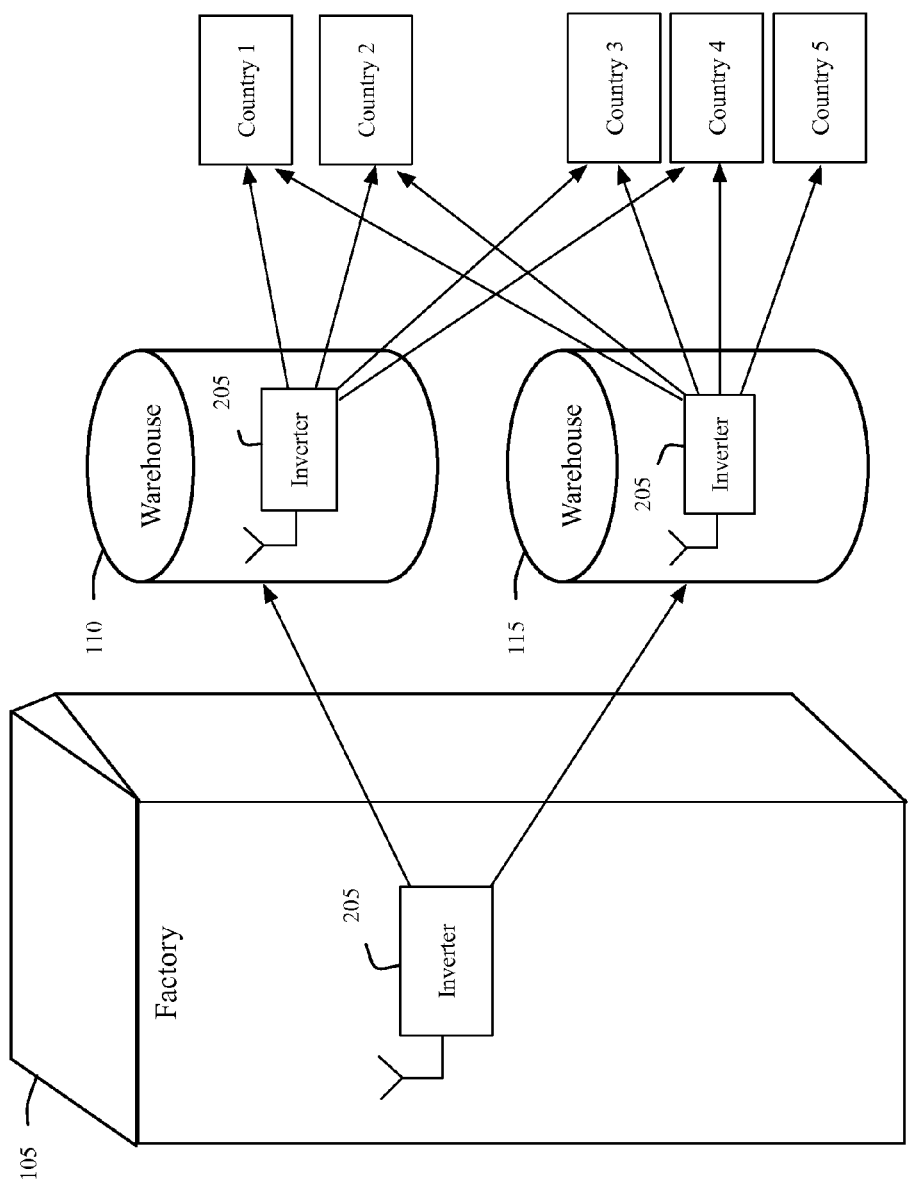
FIG. 2 conceptually illustrates a new approach of manufacturing and distributing inverters in different countries by configuring the inverters after installation in some embodiments of the invention.

FIG. 2 conceptually illustrates a new approach of manufacturing and distributing inverters to different countries by configuring the inverters after installation in some embodiments of the invention. As shown in the figure, because the inverters are configured at the field after installation, a factory 105 manufactures the same generic inverter 205 for all countries. The generic inverters 205 are stored in two warehouses 110 and 115, and distributed to five different countries, i.e., country 1-5.

The factory 105 produces the generic inverter 205, each of which can be configured after installation to comply with any grid connection standard of any country. Once the inverters are produced in the factory 105, they are stored in warehouses 110 and 115. Each of the warehouses 110 and 115 stores the same generic inverter 205. The same generic inverters 205 are distributed to different countries, e.g., country 1-5, when ordered by customers. Because the generic inverters 205 may be stored in different warehouses, a country may receive inverters from multiple warehouses. For instance, countries 1-4 receive the generic inverter 205 from both warehouses 110 and 115.

The generic inverters 205 are distributed to different countries and installed at different locations. Once installed at a particular location, the inverter is configured to comply with the local grid connection standard in order to feed converted AC into the local power grid. As illustrated in FIG. 2, because the inverters are configured at the field after installation, it is possible to manufacture and distribute a generic inverter that greatly simplifies the inventory and distribution management of the inverters.

Several more detailed embodiments of the generic inverter that is capable of being configured after installation are described in the sections below. Section I describes a typical installation of inverters. Next, Section II describes configuring inverters after they have been installed. Section III describes several examples of inverter configuration. Next, Section IV describes an example of grid connection standard. Finally, Section V describes an electronic system that implements some embodiments of the invention.

I. Installation of Inverters

Figure 3:
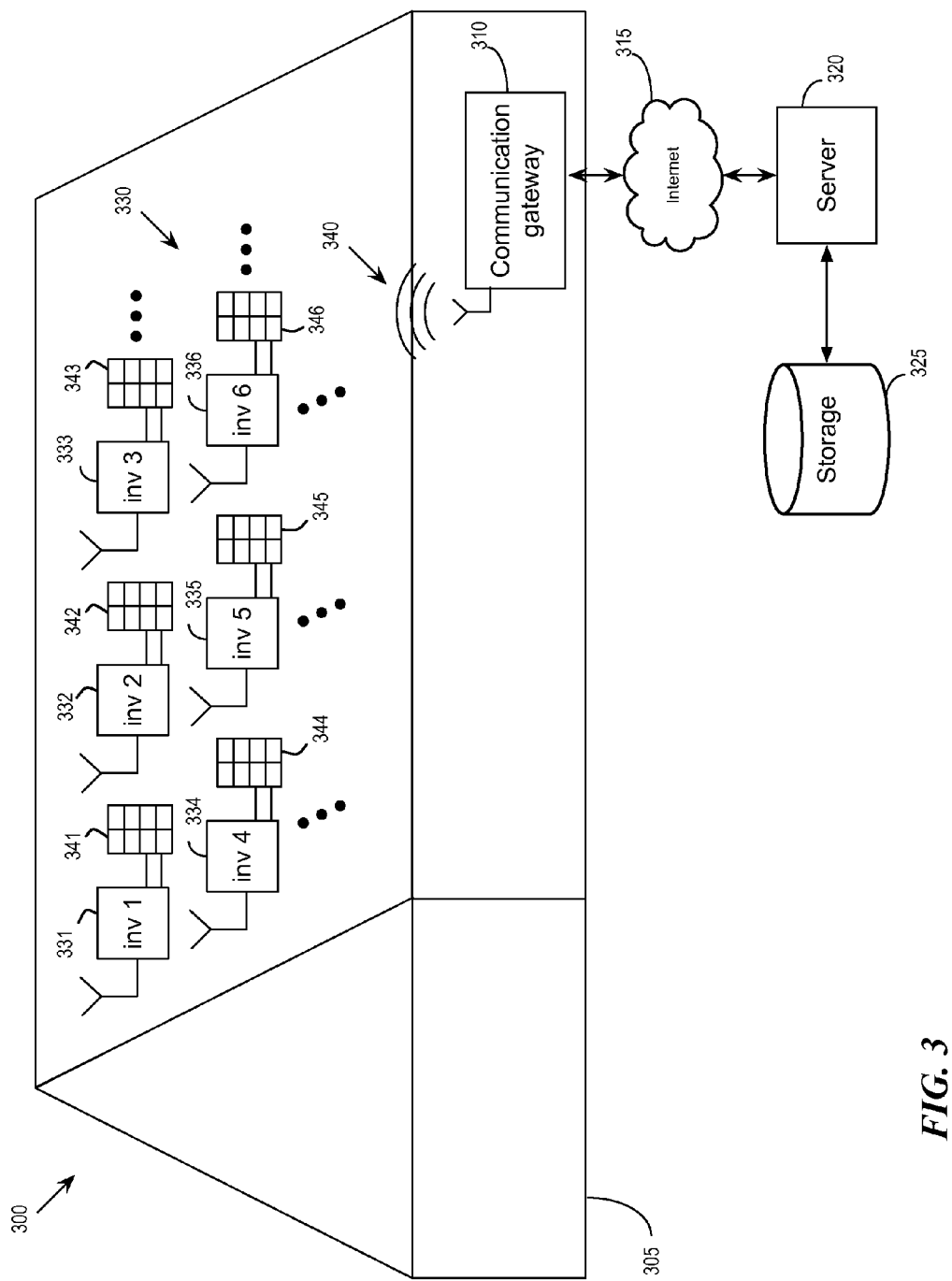
FIG. 3 conceptually illustrates a typical installation for an array of inverters.

FIG. 3 conceptually illustrates a typical installation for an array of inverters. As shown in the figure, an energy harvesting system 300 harvests solar power from photovoltaic cells in solar panels. The harvested solar energy is converted into electricity via an array 330 of inverters 331-336, which are coupled to the solar panels 341-346 and are installed on a roof of a building 305. The inverters in the energy harvesting system 300 are also in a communication system 340 that includes a communication gateway 310, which gathers information from the installed array of inverters 330. The information gathered by the communication gateway 310 is then sent to a server 320 via a network such as the Internet 315. In some embodiments, the communications gateway 310 gathers information from the server 320 and/or the Internet 315 and sends the information to the installed array of inverters 330.

The communication system 340 communicatively couples the inverters in the array 330 with the communication gateway 310 and allows information to be exchanged between devices in the communication system 340. In some embodiments, the communication system 340 is a wireless communication system. The communication system 340 can be implemented in any one of a number of wireless communication systems such as ZigBee, Wi-Fi, Bluetooth, Wireless MBus, etc. Though not illustrated, instead of or in addition to wireless systems, some embodiments use power line communication, in which a data signal is modulated over a lower frequency carrier signal that is typical of mains voltage.

The communication gateway 310 is the hub of the communication system 340. This is the case whether the communication system 340 is a wireless system or a power line based system. The communication gateway 310 is also referred to as the installation coordinator in some embodiments. The communication gateway 310 receives communication from some or all of the installed inverters in the system. In some embodiments, it also receives communications from anchor nodes (not illustrated). Anchor nodes are inverters or installation devices with known positions that can be used to ascertain the exact location of inverters. The communication gateway 310 also sends information to the array of installed inverters 330. In some embodiments, the communication gateway 310 is equipped with computing components capable of analyzing information gathered from the inverters and/or the anchor nodes. The results of the analysis are then sent to the server 320. In some embodiments, the communication gateway 310 is capable of analyzing information gathered from the server 320 and/or the Internet 315. The results of the analysis are then sent to the array of installed inverters 330.

Because the communication gateway 310 is usually in close vicinity of the array of installed inverters 330, some embodiments use the communication gateway 310 to determine the physical location for the array of installed inverters 330. The communication gateway 310 can connect to the Internet 315 through many different communication systems. For example, the communication gateway 310 can connect to the Internet 315 through an Ethernet, a Wi-Fi network, a GSM network, or some other communication systems. The communication gateway 310 is able to determine its physical location through a set of parameters from the communication system that connects it to the Internet 315. For instance, the communication gateway 310 is able to determine its physical location by the Internet Protocol (IP) address associated with it in some embodiments. The communication gateway 310 of some embodiments determines its physical location through locating the nearest Wi-Fi access point or the nearest cellular tower, depending on the type of communication system that connects it to the Internet 315.

For each determined physical location, there is a corresponding grid connection standard that needs to be complied with by the inverters in order to feed the generated AC into the local power grid. In some embodiments, the communication gateway 310 retrieves the appropriate grid connection standard based on the determined physical location and sends the grid connection standard to the array of installed inverters 330. In some other embodiments, the communication gateway 310 sends the determined physical location to the array of inverters 330 and lets each inverter to figure out applicable grid connection standard.

The server 320 receives data gathered or generated by the communication gateway 310. The server 320 also receives data request from the communication gateway 310 and sends the requested data to the communication gateway. FIG. 3 illustrates the server 320 as being accessible by the communication gateway 310 via the Internet 315. In some other embodiments (not illustrated), the server is accessible to the communication gateway 310 by other means. For example, the server 320 can be connected to the communication gateway via local area network, via wired or wireless network. The server 320 and the communication gateway 310 can also reside on the same computing device that performs the functions of both the server 320 and the communication gateway 310. In some embodiments, the database storage 325 resides on the server 320. In other embodiments, the database storage 325 resides on a computing device separate from the server 320. The database storage 325 stores the data collected from individual inverters, as well as other relevant data, e.g., a grid connection standards lookup table. In some embodiments, the server 320 is part of a device (e.g., a computing device with display capabilities) that allows the viewing of the data collected from the inverters at the server 320. In some embodiments, the collected data is pushed up to a website or another server, which allows end users to view the data.

The inverters in the array 330 such as inverters 331-336 receive DC voltage generated by the solar photovoltaic panels and converts the received DC voltage into AC electricity. Descriptions of inverters can be found in U.S. patent application Ser. No. 13/244,155, now published as U.S. Publication No. 2012/0057388, and U.S. patent application Ser. No. 13/244,161, and now published as U.S. Publication No. 2012/0063177. U.S. Publication No. 2012/0057388 and U.S. Publication No. 2012/0063177 are hereby incorporated by reference. In addition to the components necessary for converting DC voltage from solar panels to AC electricity, the inverters also include the components necessary for communications within the communication network 340. In some embodiments, the communication components residing within the inverters (e.g., 331-336) are radio frequency (RF) circuitry for wireless communications with the communication gateway 310. In some embodiments, components for other means of communications (e.g., power line communications) are included.

In addition to using the wireless/RF system for communications, some embodiments also use the RF circuitry of the inverters for ascertaining the location, or positioning of the inverters. In addition to sending information of its own position, an inverter in some embodiments also sends a unique identification (e.g., a serial number) to the server 320 via the communication gateway 310. In some embodiments, each inverter of the array 330 receives a grid connection standard from the communication gateway 310 or a handheld device (not illustrated) and configures itself according to the grid connection standard in order to feed generated AC power into the local power grid. In some embodiments, each inverter receives a physical location from the communication gateway 310 or a handheld device (not illustrated) and find out the applicable grid connection standard based on the physical location by itself. In some embodiments, each inverter of the array 330 contains a global positioning system (GPS) receiver and determines its physical location based on a GPS coordinate obtained by the GPS receiver. The inverter then identifies applicable grid connection standard and configure itself accordingly. An example inverter will be described below by reference to FIG. 4.

The GPS is a global navigation satellite system (GNSS) that provides reliable location and time information in all conditions at all times and from anywhere on Earth. In some embodiments, each anchor node includes a GPS chip. In some embodiments, each inverter includes a GPS chip as well. The exact positions of the installed inverters can be exactly ascertained based on coordinates provided by the GPS chips in the inverters.

The server 320 includes the storage 325, which is used to store data collected from individual inverters and anchor nodes, as well as other relevant data, e.g., a grid connection standards lookup table. A computing device having access to the storage 325 can use the collected data to evaluate status of the inverters and perform other analysis or operations. For example, a computing device having access to the storage 325 can search for an appropriate grid connection standard for a particular location. In some embodiments, such a computing device is part of the server 320. In some embodiments, another computer separate from the server 320 performs the analysis. Such a computer can be a computer in real-time communication with the communications system 340 (e.g., being in a same network) such that the computer can perform the analysis in real-time. Alternatively, such a computer can receive the information from the storage 325 at a later time via storage mediums such as flash drives. In addition to collecting information about inverters, some embodiments gather information about other components such as power optimizers in the solar modules. The information of these other components is also included in the analysis performed by the server 320 or other computers.

II. Configuring Inverters After Installation

Figure 4:
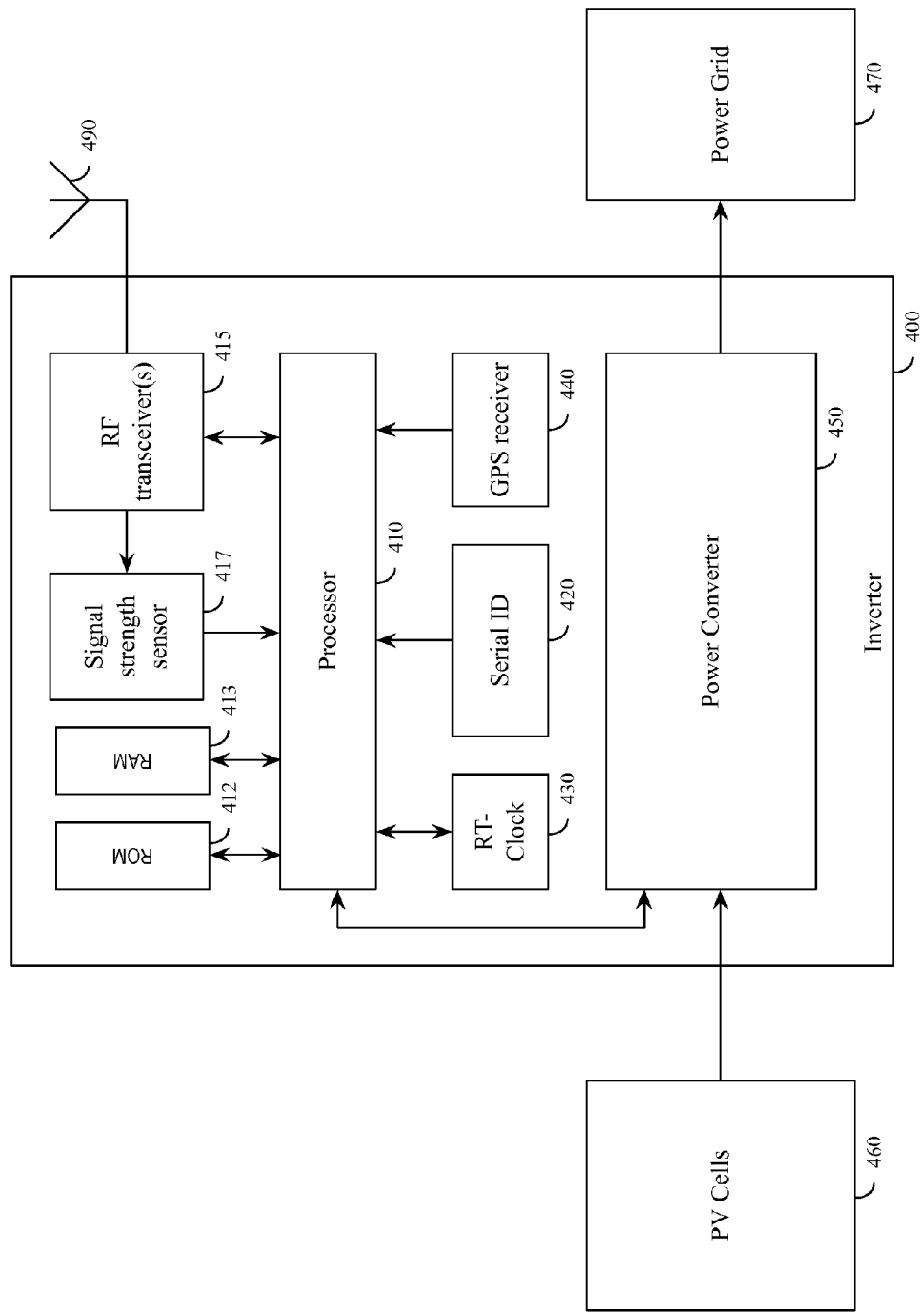
FIG. 4 illustrates a block diagram of an inverter that can be used to implement the array of inverters of FIG. 3.

FIG. 4 illustrates a block diagram of an inverter 400 that can be used to implement the array of inverters 330 of FIG. 3 (i.e., each of the inverters 331-336 can be implemented based on the inverter 400). The inverter 400 converts DC voltage generated by photovoltaic cells 460 into AC electricity for power grid 470. The inverter 400 also includes components necessary for configuring itself to comply with a local grid connection standard and/or for communications within a communication network. The inverter 400 includes a processor 410, a transceiver(s) 415, an antenna 490, a signal strength sensor 417, a read-only memory (ROM) 412, a random-access memory (RAM) 413, a serial number 420, a real-time clock 430, a GPS receiver 440, and a power converter 450.

The power converter 450 converts the DC voltage received from the photovoltaic cell 460 to AC electricity for the power grid 470. In some embodiments, power converters are also referred to as power conditioning units. Descriptions of power converters or power conditioning units can be found in U.S. patent application Ser. No. 13/244,155, now published as U.S. Publication No. 2012/0057388, U.S. patent application Ser. No. 13/244,161, now published as U.S. Publication No. 2012/0063177, and U.S. patent application Ser. No. 13/310,691, now published as U.S. Publication No. 2012-0098346. In some embodiments, various components in the inverter 400 (e.g., the processor 410 and the RF transceiver 415) are powered by energy from the photovoltaic cell 460. In some of these embodiments, the solar power is provided via the power converter 450.

Some of the operations performed by the power converter 450 are monitored and controlled by the processor 410. In some embodiments, the power converter 450 includes its own micro-controller(s) (not illustrated) for controlling the transfer of power from the PV cell 460 to the power grid 470 (e.g., by controlling the transistor drivers in the power converter 450), and the processor 410 monitors and controls the power converter 450 by communicating with the micro-controller(s) in the power converter 450. In some other embodiments, the transfer of power in the power converter 450 is controlled by a micro-controller (or processor) that also controls the communications of the micro-inverter 400.

In some embodiments, the processor 410 controls the operations performed by the power converter 450 based on a set of parameters stored in the ROM 412. The set of parameters determines how the power converter 450 should behave in converting power from DC to AC. The power converter 450 performs different operations under the control of the processor 410 when the set of parameters stored in the ROM 412 are different. For example, the power converter 450 complies with different grid connection standards when the set of parameters are set at different values. This enables the inverter 400 to be configured after installation by changing the set of parameters stored in the ROM 412. In some embodiments, the micro-controller(s) (not illustrated) in the power converter 450 accesses the set of parameters stored in the ROM 412 in order to control the operations performed by the power converter 450. For example, the micro-controller(s) use the set of parameters to control the transistor drivers in the power converter 450 differently in order to comply with local grid connection standard. In some embodiments, the ROM 412 is part of the power converter 450.

In some embodiments, the processor 410 controls the operations performed by the power converter 450 by executing a set of instructions stored in the ROM 412. The set of instructions determines how the power converter 450 should behave in converting power from DC to AC. The power converter 450 performs different operations under the control of the processor 410 when the set of instructions stored in the ROM 412 are different. For example, the power converter 450 complies with different grid connection standards when the set of instructions stored in the ROM 412 are different. This enables the inverter 400 to be configured after installation by changing the set of instructions stored in the ROM 412. In some embodiments, the micro-controller(s) (not illustrated) in the power converter 450 executes the set of instructions stored in the ROM 412 in order to control the operations performed by the power converter 450. For example, the micro-controller(s) execute the set of instructions to control the transistor drivers in the power converter 450 in order to comply with local grid connection standard. The RAM 413 allows the processor 410 to access certain frequent used data quickly in any random order.

The RF transceiver 415 transmits and receives RF signals to and from one or more other RF capable devices via the antenna 490. In the example of FIG. 3, the RF transceivers in the inverters 331-336 transmit and receive RF signals to and from the communications gateway 310. In some embodiments, the RF transceivers in the micro-inverters 331-336 transmit and receive RF signals to and from other micro-inverters in the array 330 in a mesh-like manner. In some embodiments, the RF transceivers 415 transmit and receive RF signals to and from anchor nodes for ascertaining the position of the micro-inverter 400. In some embodiments, the RF transceiver 415 includes multiple RF transceivers for transmitting and receiving RF signals to and from multiple RF capable devices simultaneously.

In some embodiments, the RF transceiver 415 is used to communicate and exchange data with other devices in a RF communications network (e.g., the communication network 340) via the RF signals being received. In some of these embodiments, the inverters 331-336 communicate with the communication gateway 310 and/or other inverters in the array 330. In some other embodiments, the RF receiver 415 is only used for determining the position of the inverter 400 but not for communications. In some of these embodiments, the inverter 400 includes one or more communications components (such as for performing power line communications) for sending and receiving data.

The signal strength sensor 417 measures the strength of the RF signal received by the RF transceiver 415. The signal strengths detected by the signal strength sensors in individual inverters are used by some embodiments to determine the position of the inverters. In some embodiments, the inverter 400 performs received signal strength indicator (RSSI) and/or link quality indicator (LQI) measurement based on the RF signal received. In some of these embodiments, the signal strength sensor 400 provides raw measurements to the processor 410 to compute RSSI or LQI values. In some other embodiments, the inverter 400 does not include the signal strength sensor 417, and the processor 410 computes the RSSI or LQI readings directly based on the data received by the RF transceiver 415.

The processor 410 controls the communication between the inverter 400 and other devices. The processor 410 receives demodulated data from the RF transceiver 415. The processor 410 also produces data to be modulated and transmitted by the RF transceiver 415. In addition to processing data being transmitted or received by the RF transceiver 415, the processor 410 also receives readings provided by the signal strength sensor 417, the real-time clock 430, the GPS receiver 440, and the serial number 420. The content of the real-time clock 430 in some embodiments can be updated by the processor 410 based on the communications with other devices. The processor 410 produces the transmit data for the RF transceiver 415 based on some or all of these readings. In some embodiments that do not use the RF transceiver for data communications, the processor 410 goes through another communications component (e.g., a module for power line communications, not illustrated) for transmitting and receiving data.

In some embodiments, the processor 410 is a microprocessor that executes a set of instructions for producing the transmit data for the RF transceiver 415. For example, in some embodiments, the processor 410 composes data packets to be transmitted by the RF transceiver 415 based on previously received data, the real-time clock (430), the serial number (420), the GPS coordinates (440), and the signal strength sensor reading (417). By receiving and transmitting these data, the inverter 400 enables the energy harvesting system that includes the inverter to automatically determine its location and identify an appropriate grid connection standard to configure the inverter.

In some embodiments, the processor 410 also controls and monitors the power converter 450. The processor 410 communicates with the power converter 450 and relays its status to other devices (e.g., the communication gateway 310) via the RF transceiver 415. In some other embodiments, the power transfer operation and the communication operation are performed by a single micro-controller or microprocessor.

One of ordinary skill in the art will recognize that the diagram in FIG. 4 is a conceptual representation of the components of an inverter. The components in a specific inverter may not be exactly the same as illustrated in this figure. For example, an inverter may not be equipped with the GPS receiver 440 and the processor 410 could be an integrated part of the power converter 450.

Figure 5:
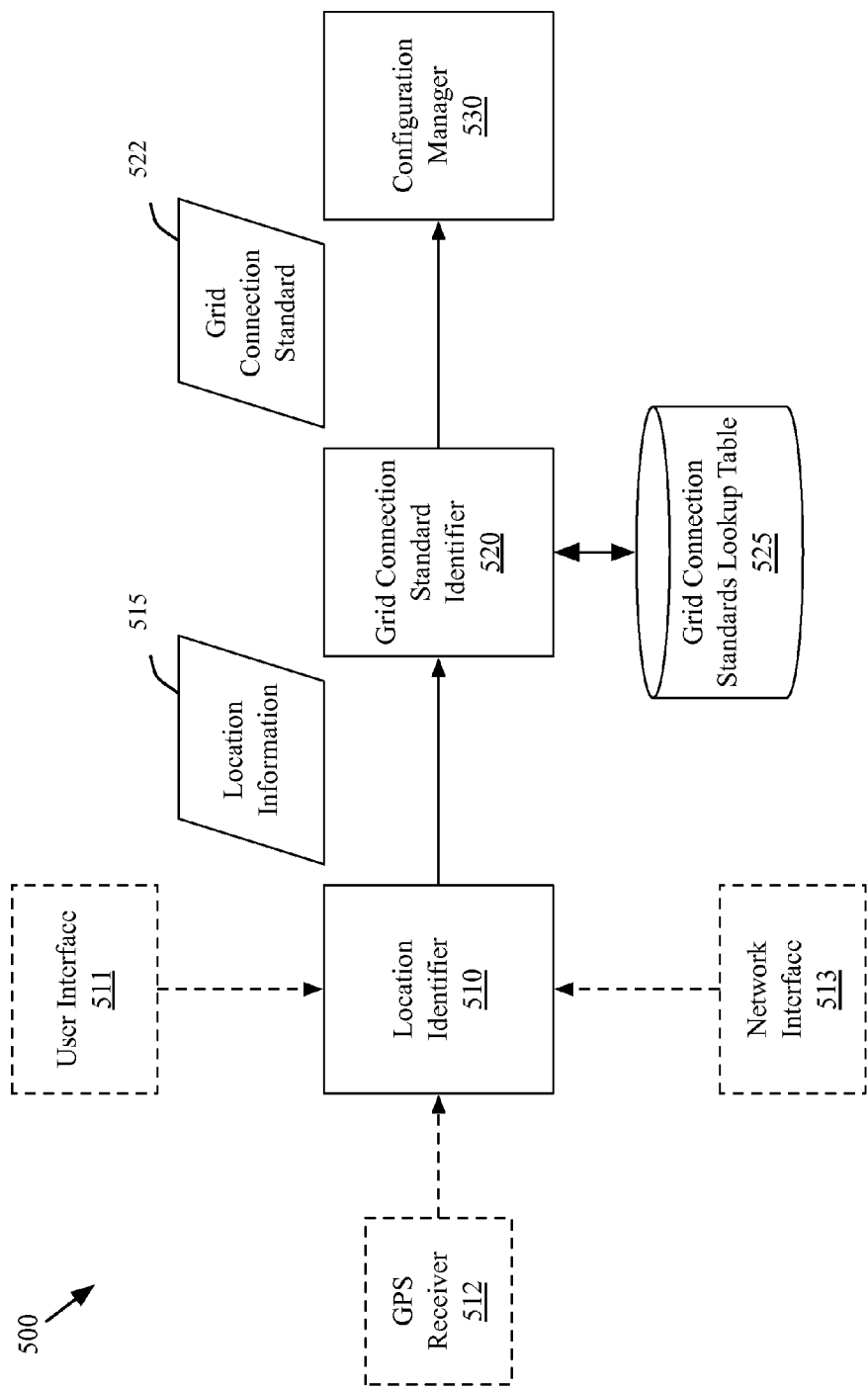
FIG. 5 conceptually illustrates an inverter configuration module of some embodiments.

FIG. 5 conceptually illustrates an inverter configuration module 500 of some embodiments. Specifically, the figure illustrates an example of configuring an inverter to comply with a grid connection standard based on the installation location of the inverter. In some embodiments, the inverter configuration module 500 is a stand-alone software application, while in other embodiments the inverter configuration module 500 is part of an inverter operation control application. As shown, this figure illustrates a location identifier 510, a grid connection standard identifier 520, a grid connection standards lookup table 525, and a configuration manager 530.

The location identifier 510 determines the installation location of the inverter and sends the location information 515 to the grid connection standard identifier 520. In some embodiments, the location identifier 510 receives the installation location through a user interface 511. The user interface 511 receives the installation location through user input and sends the location to the location identifier 510. In some embodiments, the location identifier 510 validates the user input and/or converts the user input to a standard form before sending the location information 515 to the grid connection standard identifier 520. In some embodiments, the location identifier 510 receives the installation location through a GPS receiver 512. The GPS receiver 512 receives a GPS signal that identifies the installation location and forwards the location to the location identifier 510. In some embodiments, the location identifier 510 receives the installation location through a network interface 513. The network interface 513 connects the location identifier 510 to a communication network, e.g., the commutation network 340 described above by reference to FIG. 3. As a result, the location identifier 510 is able to obtain the installation location from other devices in the communication network, e.g., the communication gateway 310 described above by reference to FIG. 3, or a handheld installation device located nearby.

The communication gateway is able to determine its location through its connection to the Internet. Since the communication gateway is always in close vicinity of the installed array of inverters, the location of the communication gateway can be treated as the location of the installed inverters. In some embodiments, a handheld installation device is connected to each inverter in the array of installed inverters through a wired connection or a short-range wireless connection. A user may input the installation location through the handheld installation device. That installation location is then transmitted to each installed inverter. The handheld installation device of some embodiments is equipped with a GPS receiver and can determine the current location of the handheld device through the GPS receiver. That location is then transmitted to each installed inverter as the installation location of the inverter since the handheld device is in close vicinity of the installed inverters.

In some embodiments, the location identifier 510 uses a combination of two or more approaches to identify the installation location. For example, the location identifier 510 may receive an installation location identified by the communication gateway through the network interface 513 and confirm the location with user input received from the user interface 511.

The grid connection standard identifier 520 receives the location information 515 from the location identifier 510 and sends a grid connection standard 522 to the configuration manager 530. The grid connection standard identifier 520 identifies the grid connection standard 522 based on the received location information 515. In some embodiments, the grid connection standard identifier 520 queries the grid connection standards lookup table 525 in order to find the applicable grid connection standard for a particular location. The grid connection standards lookup table 525 contains all the grid connection standards and the corresponding geographic regions for each grid connection standard. In some embodiments, the grid connection standards lookup table 525 is located within the inverter. In other embodiments, the grid connection standards lookup table 525 is on a device separated from the inverter and the grid connection standard identifier 520 uses a communication network to communicate with that device in order to query the grid connection standards lookup table 525.

The configuration manager 530 receives the grid connection standard 522 and configures the inverter accordingly. In some embodiments, the configuration manager 530 stores the grid connection standard 522 as a set of parameters in a non-volatile memory (e.g., the ROM 412 as described above by reference to FIG. 4) of the inverter and a controller (e.g., the processor 410 as described above by reference to FIG. 4) configures the power converting component (e.g., the power converter 450 as described above by reference to FIG. 4) based on that set of parameters. In some embodiments, the configuration manager 530 loads a unique set of instructions for each different grid connection standard for executing by the controller or processor of the inverter.

Figure 6:
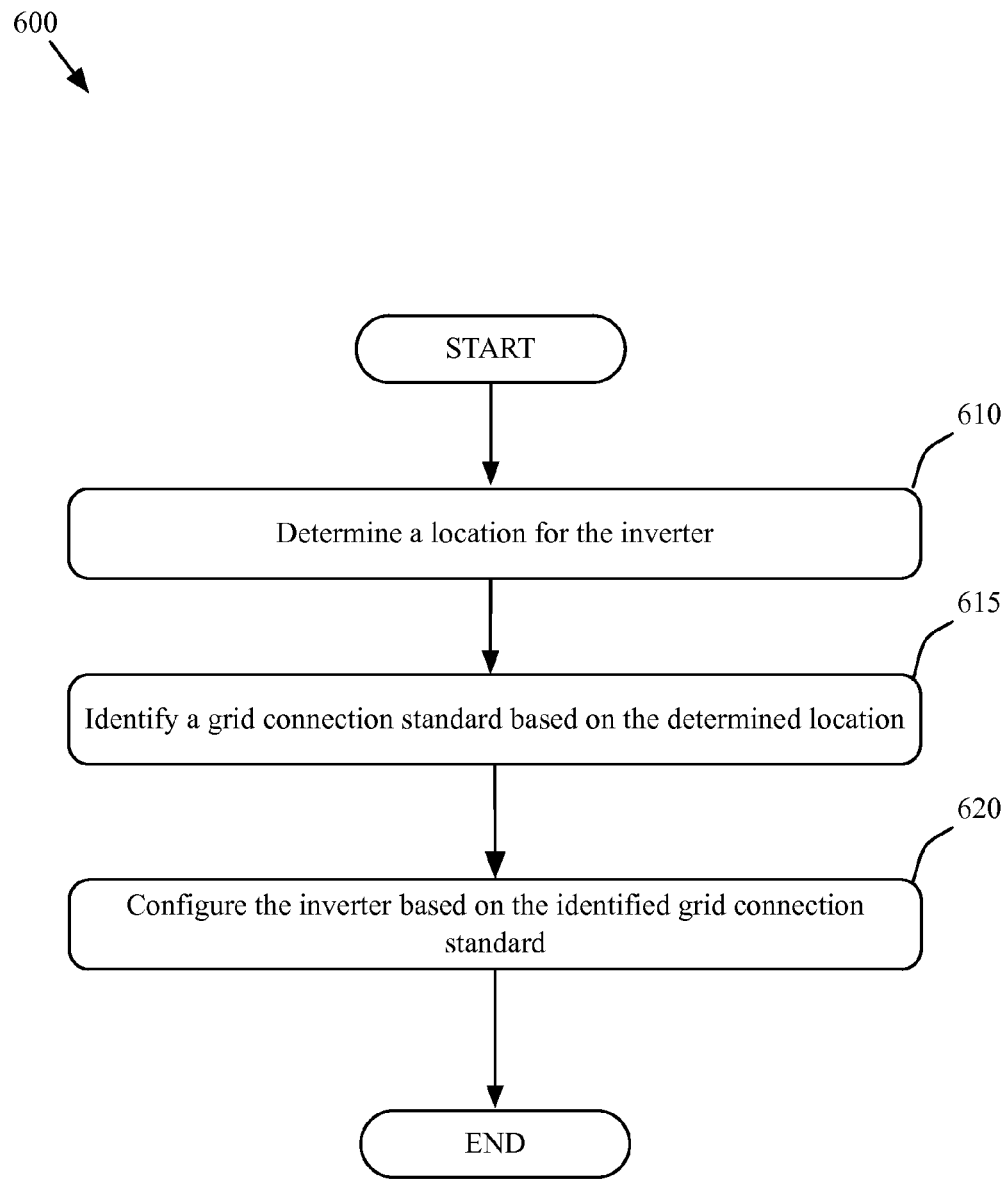
FIG. 6 conceptually illustrates a process performed by some embodiments to configure an inverter to comply with an appropriate grid connection standard based on the installation location of the inverter.

An example operation of the inverter configuration module 500 will now be described by reference to FIG. 6. FIG. 6 conceptually illustrates a process 600 performed by some embodiments to configure an inverter to comply with an appropriate grid connection standard based on the installation location of the inverter. In some embodiments, the process 600 starts automatically when the inverter is installed and connected to a power line. In some embodiments, the process 600 starts when the inverter receives a command to start configuration.

As shown in the figure, the process determines (at 610) a location for the installed inverter. As described above by reference to FIG. 5, the installation location can be determined by receiving a user inputted location through a user interface, by receiving a GPS signal that indicates the location of the inverter through a GPS receiver within the inverter, or by receiving a location through a network interface of a communication network. The location received through the network interface comes from another device in the communication network, e.g., the communication gateway 310 described above by reference to FIG. 3, or a handheld installation device located nearby. The communication gateway is able to determine its location through its connection to the Internet. Since the communication gateway is always in close vicinity of the installed inverter, the location of the communication gateway can be treated as the location of the inverter.

In some embodiments, the handheld installation device is connected to the inverter through a wired connection or a short-range wireless connection. A user may input the installation location through the handheld installation device. The handheld installation device of some embodiments is equipped with a GPS receiver and can determine the current location of the handheld device through the GPS receiver. That location is then transmitted to the inverter as the installation location of the inverter.

After determining the installation location for the inverter, the process 600 then identifies (at 615) a grid connection standard based on the determined location. In some embodiments, the process 600 queries a grid connection standards lookup table in order to find the applicable grid connection standard for the determined location. The grid connection standards lookup table contains all the grid connection standards and the corresponding geographic regions for each grid connection standard. In some embodiments, the grid connection standards lookup table is located within the inverter. In other embodiments, the grid connection standards lookup table is on a device separated from the inverter and the process 600 query the grid connection standards lookup table through a communication network.

Next, the process 600 configures (at 620) the inverter based on the identified grid connection standard. In some embodiments, the process 600 stores the identified grid connection standard as a set of parameters in a non-volatile memory (e.g., the ROM 412 as described above by reference to FIG. 4) of the inverter to enable a processor or controller of the inverter to configure the power converting component (e.g., the power converter 450 as described above by reference to FIG. 4) based on the set of parameters. In some embodiments, the process 600 loads a unique set of instructions for the identified grid connection standard for executing by the controller or processor of the inverter. The process 600 then terminates.

One of ordinary skill in the art will recognize that the process 600 is a conceptual representation of the operations used to configure an inverter to comply with an appropriate grid connection standard based on the installation location of the inverter. The specific operations may not be performed in one continuous series of operations, and different specific operations may be performed in different embodiments. Furthermore, the process could be implemented using several sub-processes, or as part of a larger macro process. For instance, in some embodiments, the process 600 is performed by one or more software applications that execute on one or more devices.

III. Inverter Configuration Examples

Different embodiments use different approaches to configure an inverter after installation. For example, some embodiments configure an array of inverters installed in the same installation based on a grid connection standard identified by a communication gateway of the installation. In some embodiments, an installer configures an array of installed inverters by pushing configuration data to each inverter using a handheld device connected to the inverter through a wired connection or a short-range wireless connection. In some of these embodiments, the configuration data includes location information. In other embodiments, the configuration data includes a grid connection standard. The location information is provided by the installer's manual input or by a GPS receiver within the handheld device in some embodiments. In some other embodiments, the configuration data includes a grid connection standard. Several detailed examples of inverter configuration will be described below by reference to FIGS. 7-11.

A. Configuring Inverters Through a Communication Gateway

Figure 7:
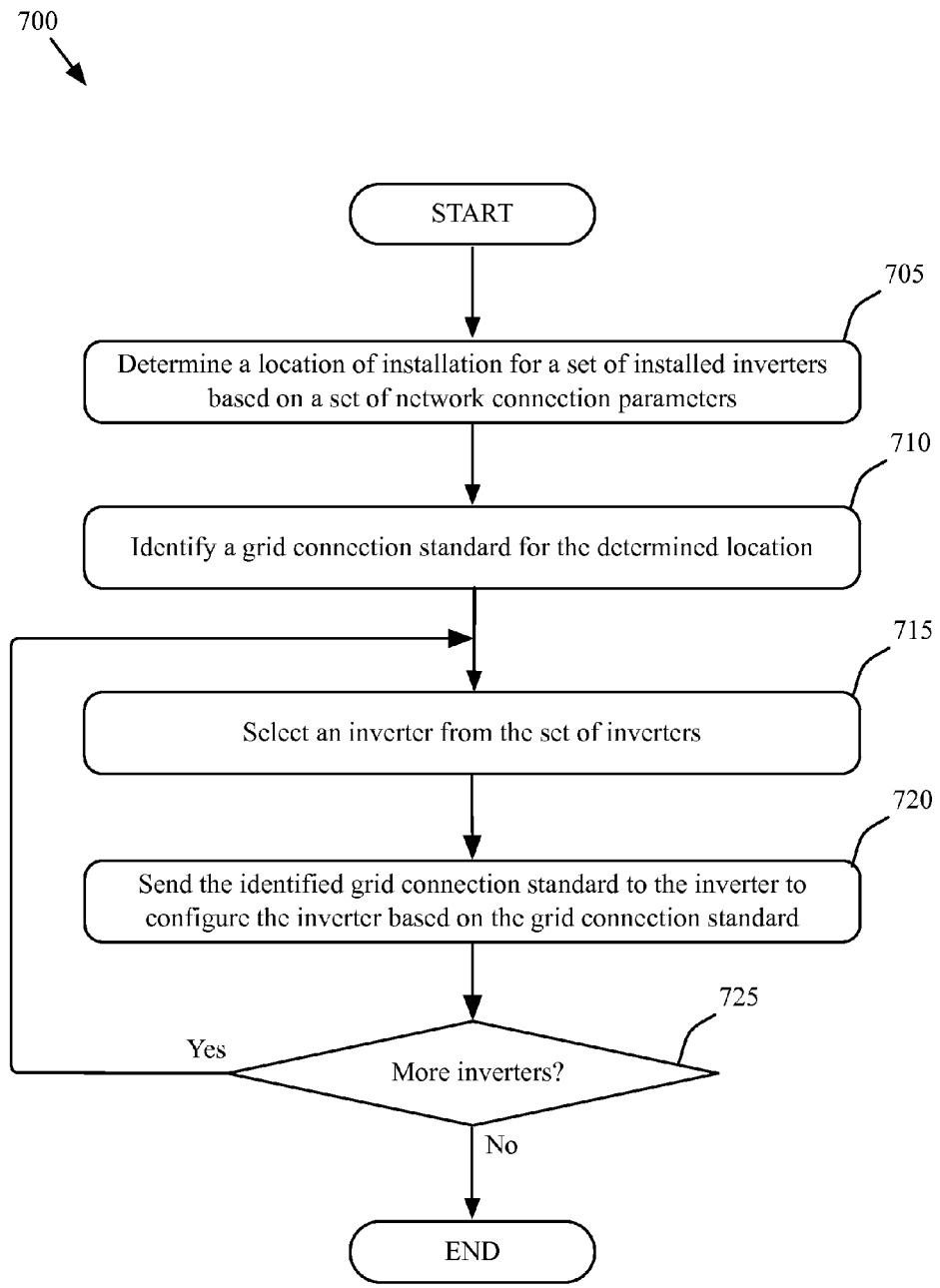
FIG. 7 conceptually illustrates a process performed by some embodiments to configure a set of installed inverters through a communication gateway.

FIG. 7 conceptually illustrates a process 700 performed by some embodiments to configure a set of installed inverters through a communication gateway. Details of a communication gateway are described above by reference to FIG. 3. In some embodiments, the process 700 starts automatically when the set of installed inverter is connected to a communication gateway. In some embodiments, the process 700 starts when the communication gateway receives a command to start configuration. As shown in FIG. 7, the process 700 determines (at 705) a location of installation for a set of installed inverters based on a set of network connection parameters. In some embodiments, the set of network connection parameters is determined by the physical location of the communication gateway, because the communication gateway is physically close to the installed inverters and its location can be used as the installation location of the installed inverters.

The communication gateway can connect to the Internet through many different communication systems. For example, the communication gateway can connect to the Internet through an Ethernet, a Wi-Fi network, a GSM network, or some other communication systems. In some embodiments, the communication gateway determines its physical location through a set of parameters associated with the communication system that connects it to the Internet. For instance, the communication gateway in some embodiments determines its own physical location by its assigned IP address in the Internet. In some embodiments, the communication gateway determines its own physical location based on the location of the nearest Wi-Fi access point or the nearest cellular tower.

The process 700 then identifies (at 710) a grid connection standard for the determined physical location. In some embodiments, the process 700 queries a grid connection standards lookup table in order to find the applicable grid connection standard for the determined location. The grid connection standards lookup table contains all the grid connection standards and the corresponding geographic regions that utilize each grid connection standard. In some embodiments, the grid connection standards lookup table is located within the communication gateway. In some other embodiments, the grid connection standards lookup table is stored in a device separated from the communication gateway and the process 700 query the grid connection standards lookup table through a communication network.

Next, the process 700 selects (at 715) an inverter from the set of inverters. The process 700 then sends (at 720) the identified grid connection standard to the selected inverter in order to configure the inverter based on the grid connection standard. In some embodiments, the inverter stores the grid connection standard as a set of parameters in a non-volatile memory of the inverter and a controller configures the power converting component of the inverter based on that stored set of parameters. In some embodiments, the inverter loads a unique set of instructions for the grid connection standard for execution by a controller or processor of the inverter.

The process 700 then determines (at 725) whether there are more inverters that need to be configured. When there is at least one more inverter that needs to be configured, the process 700 loops back to 715 and selects another inverter from the set of inverters. When the process 700 determines (at 725) that there is no more inverter that needs to be configured, the process terminates.

One of ordinary skill in the art will recognize that the process 700 is a conceptual representation of the operations used to configure installed inverters through a communication gateway. The specific operations of the process 700 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 700 is performed by one or more software applications that execute on one or more computers. In some embodiments, the communication gateway sends the identified grid connection standard to multiple inverters at the same time rather than sending it one by one. The process of some embodiments sends the determined location of the communication gateway to the inverters and let each inverter to figure out the applicable grid connection standard.

B. Configuring Inverter Through Equipped GPS Receiver

In some embodiments, the communication gateway has no Internet connection and an installed inverter has to configure itself by using its own equipped GPS receiver.

Figure 8:
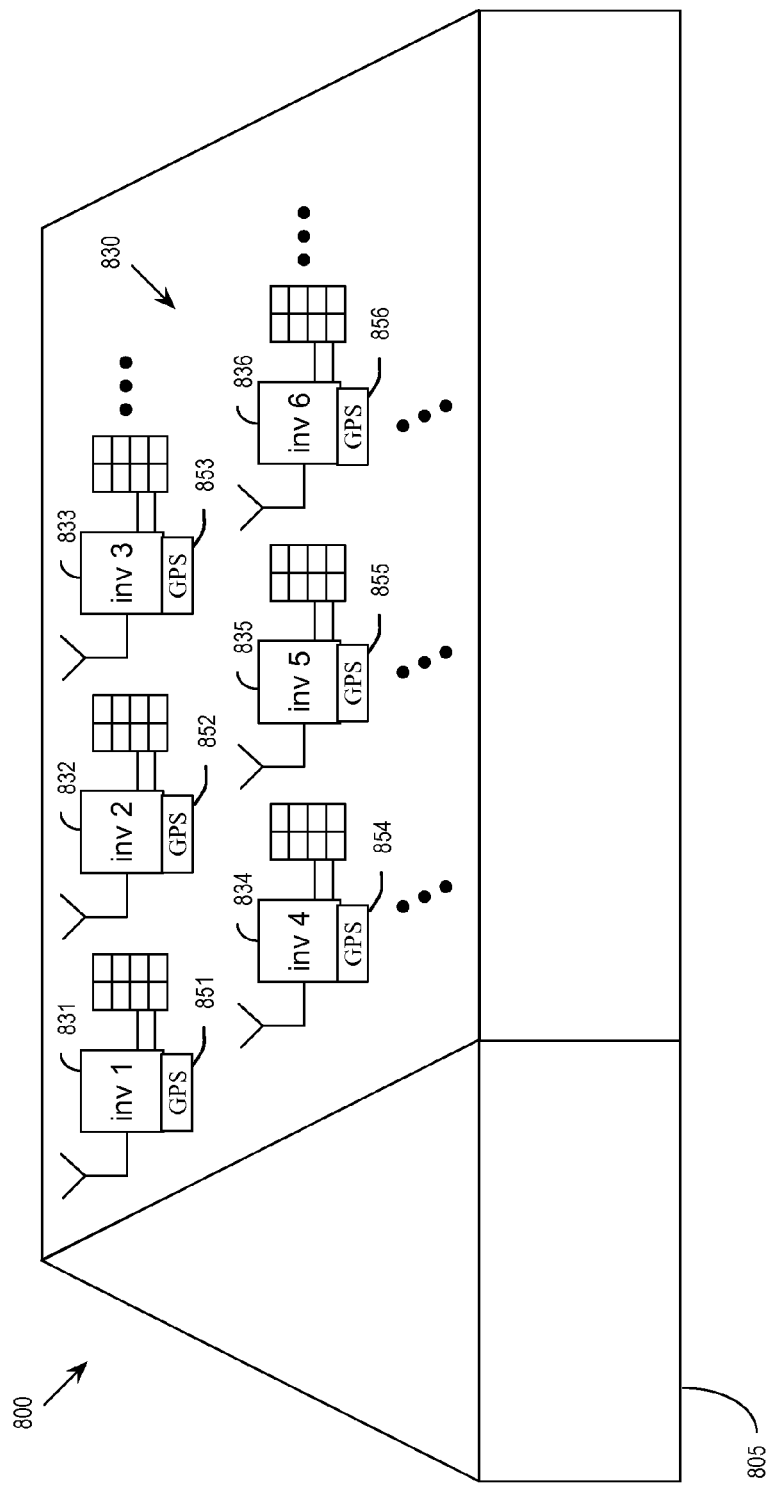
FIG. 8 conceptually illustrates an installation for an array of inverters that use equipped GPS receivers to configure themselves in some embodiments of the invention.

FIG. 8 conceptually illustrates an installation for an array of inverters that use equipped GPS receivers to configure themselves in some embodiments of the invention. As shown in the figure, an energy harvesting system 800 harvests solar power from photovoltaic cells in solar panels. The harvested solar energy is converted into electricity via an array 830 of inverters, which are coupled to the solar panels and are installed on a roof of a building 805.

The inverters in the array 330 such as inverters 331-336 receive DC voltage generated by the solar photovoltaic panels and convert the received DC voltage into AC electricity. Descriptions of inverters can be found in the above mentioned U.S. patent application Ser. No. 13/244,155, now published as U.S. Publication No. 2012/0057388, and U.S. patent application Ser. No. 13/244,161, and now published as U.S. Publication No. 2012/0063177.

For each determined physical location, there is a corresponding grid connection standard that needs to be complied with by the inverters in order to feed the generated AC into the local power grid. In some embodiments, each inverter of the array 330 is equipped with a global positioning system (GPS) receiver (such as GPS receivers 851-856) and determines its physical location based on a GPS coordinate obtained by the GPS receiver. The inverter then identifies applicable grid connection standard based on the physical location obtained through the GPS receiver. The inverter then configures itself according to the identified local grid connection standard.

C. Manual Configuration

Figure 9:
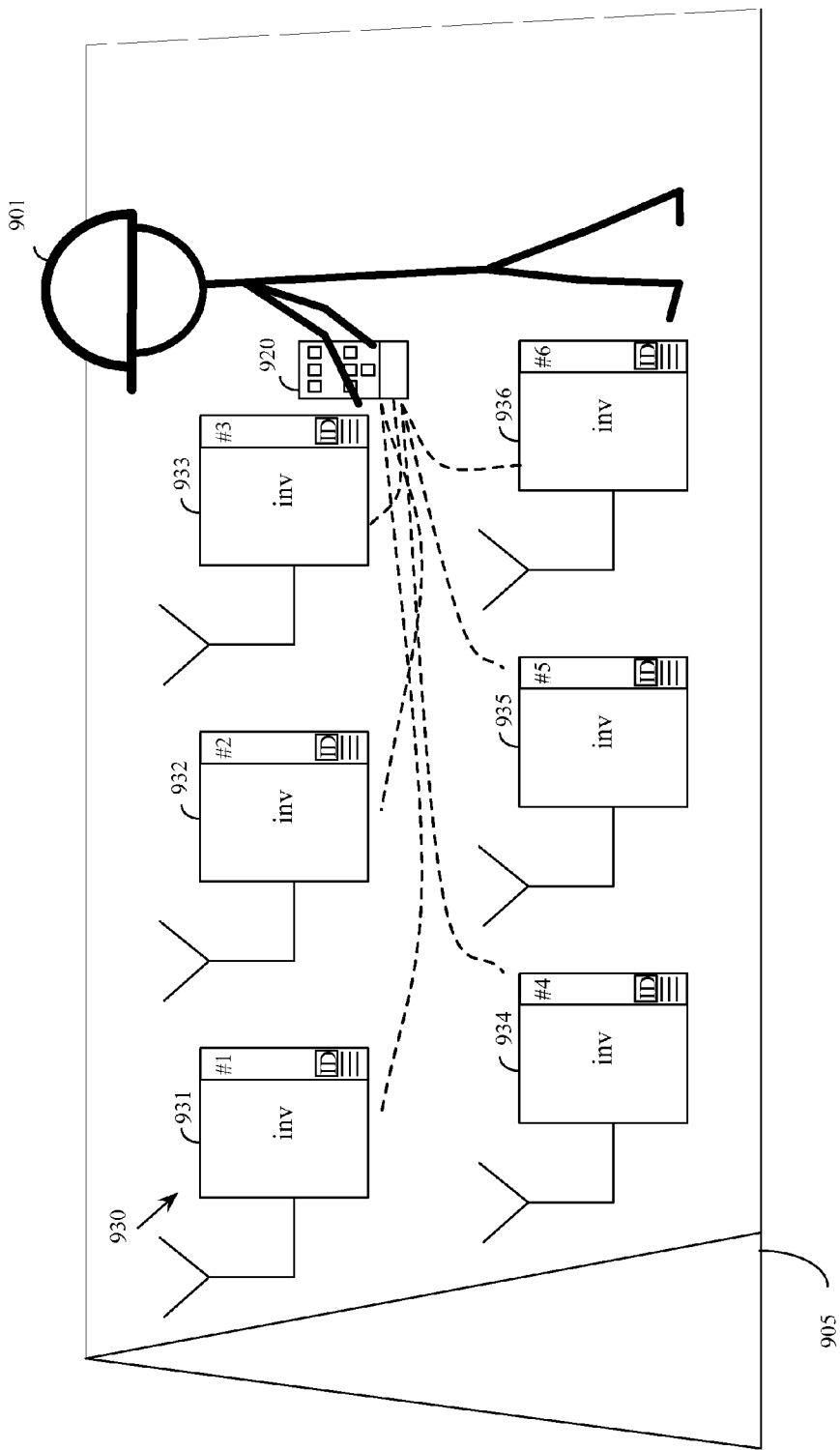
FIG. 9 conceptually illustrates using a handheld device to configure a set of installed inverters.

In some embodiments, the communication gateway is not connected to the Internet and the inverters are not equipped with GPS receivers. In some of these embodiments, an installer manually configures a set of installed inverters by pushing configuration data to each inverter using a handheld device. The handheld device connects to each inverter through a wired connection or a short-range wireless connection. FIG. 9 conceptually illustrates using a handheld device to configure a set of installed inverters. Specifically, this figure illustrates an installer 901 carrying a handheld device (e.g., a mobile device) 920 that is used as an installation or monitoring device for the inverters. As shown, the figure illustrates an array 930 of inverters is installed on the building 905 and an installer 901 carrying a handheld device 920 is configuring the array of inverters. The array of inverters 930 includes six inverters 931-936.

The installer 901 carries the handheld device 920 near the inverters in the array 930. The handheld device 920 connects to each inverter in the array 930 through a short-range wireless connection (e.g., Wi-Fi or Bluetooth) or a wired connection. In some embodiments, the installer 901 manually input a location into the handheld device 920. The handheld device 920 then identifies a corresponding grid connection standard for the location and sends the grid connection standard to each inverter in the array 930. Each inverter in the array 930 configures itself to comply with the grid connection standard in order to feed its generated power into the local power grid. In some embodiments, the handheld device 920 simply sends the inputted location to each inverter in the array 930 and let each inverter to figure out the appropriate grid connection standard by itself. Each inverter in the array 930 then configures itself to comply with the grid connection standard in order to feed generated power into the local power grid.

Figure 10:
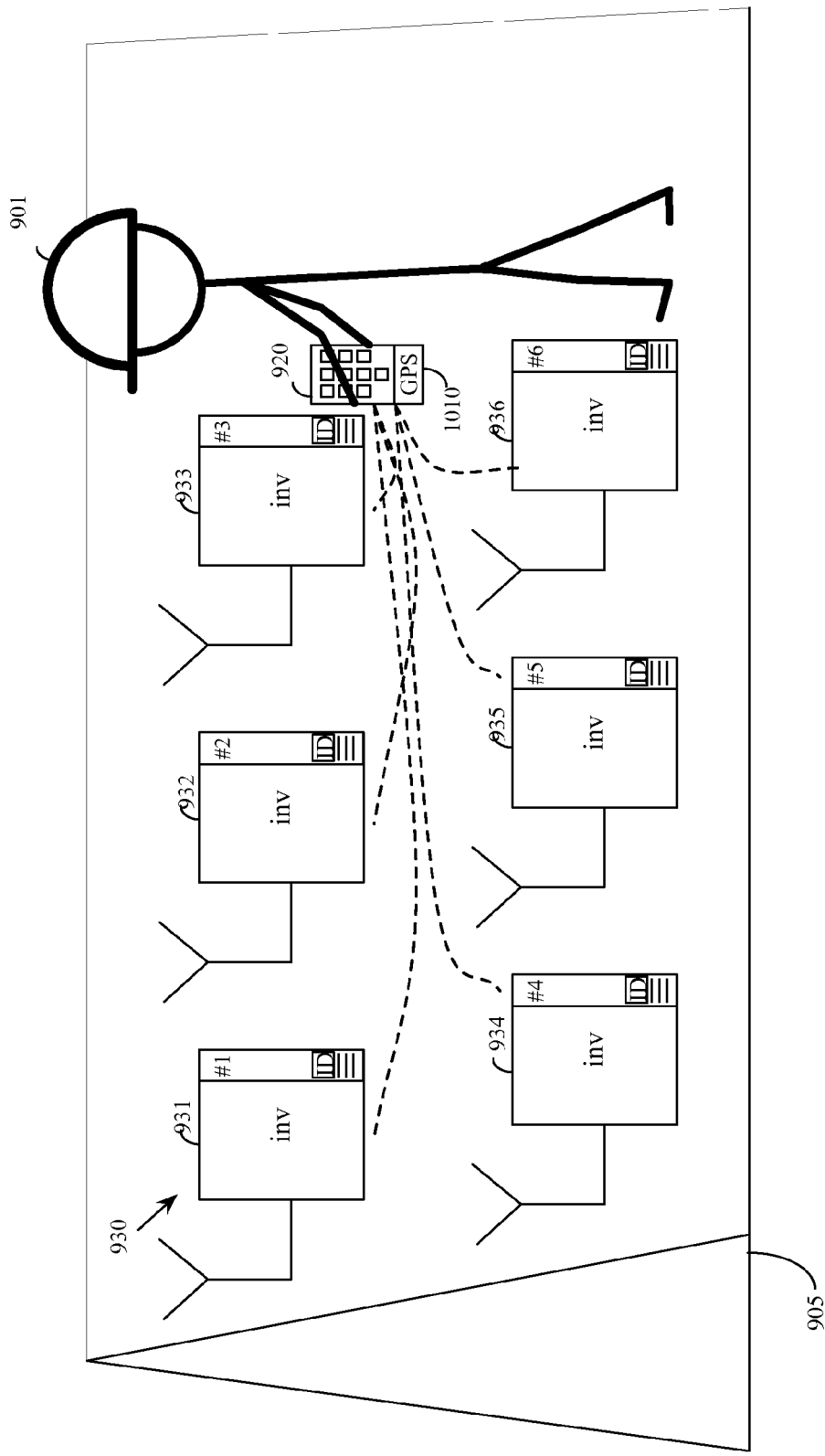
FIG. 10 conceptually illustrates using a handheld device equipped with a GPS receiver to configure a set of installed inverters.

FIG. 10 conceptually illustrates using a handheld device equipped with a GPS receiver to configure a set of installed inverters. Specifically, this figure illustrates an installer 901 carrying a handheld device 920 equipped with a GPS receiver 1010 to configure the inverters. As shown, the figure illustrates an array of inverters 930 installed on the building 905. An installer 901 is carrying a handheld device 920 and configuring the array of inverters 930. The array of inverters 930 includes inverters 931-936. The handheld device 920 includes a GPS receiver 1010.

The installer 901 carries the handheld device 920 near each of the inverter in the array 930. The handheld device 920 connects to each inverter in the array 930 through a short-range wireless connection (e.g., Wi-Fi or Bluetooth) or a wired connection. Instead of manually inputting a location into the handheld device 920, the GPS reading of the GPS receiver 1010 determines the location of the handhold device 920. The handheld device 920 is physically close enough to the array of inverters 930 such that the location of the handheld device 920 represents the location of the array of inverters 930.

In some embodiments, the handheld device 920 identifies a corresponding grid connection standard for the determined location and sends the grid connection standard to each inverter in the array 930. Each inverter in the array 930 then configures itself to comply with the grid connection standard in order to feed its generated power into the local power grid. In some embodiments, the handheld device 920 simply sends the location detected by the GPS receiver 1010 to each inverter in the array 930 and let each inverter to figure out the appropriate grid connection standard by itself. Each inverter in the array 930 then configures itself to comply with the grid connection standard in order to feed generated power into the local power grid.

The handheld device 920 is equipped with GPS and can be carried to be physically near any object. Such handheld device can be a Smart phone, a PDA, a GPS device, etc. When placed near an installed inverter, the GPS reading of the handheld device 920 can be transmitted to the installed inverter as the location of the inverter.

Figure 11:
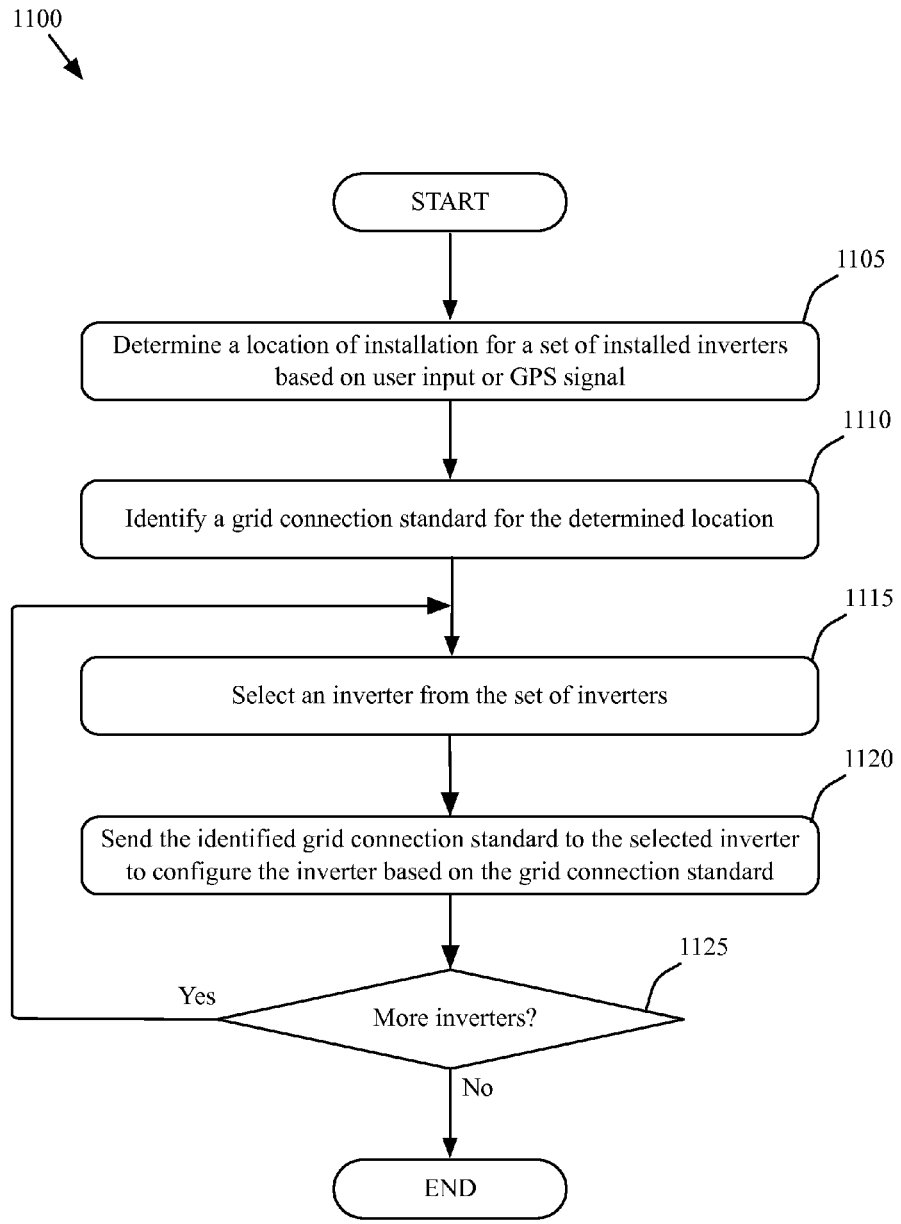
FIG. 11 conceptually illustrates a process performed by some embodiments to configure a set of installed inverters by a handheld device to comply with an appropriate grid connection standard.

For some embodiments, FIG. 11 conceptually illustrates a process 1100 performed by some embodiments to configure a set of installed inverters by a handheld device to comply with an appropriate grid connection standard. In some embodiments, the process 1100 starts automatically when the handheld device is communicatively connected to the set of installed inverters. In some embodiments, the process 600 starts when the handheld device receives a command to start configuration.

The process 1100 begins by determining (at 1105) a location of installation for the set of installed inverters based on a user input or a GPS coordinate. In some embodiments, a user will tell the handheld device where the set of inverters are located (e.g., by manually input). In other embodiments, a GPS receiver equipped on the handheld device will provide a GPS coordinate of the handheld device. Since the handheld device is presumed to be in close proximity of the installed inverters during this operation, the GPS coordinate of the handheld device can also be treated as the location of the set of installed inverters.

The process 1100 then identifies (at 1110) a grid connection standard for the determined location. In some embodiments, the process 1100 queries a grid connection standards lookup table in order to find the applicable grid connection standard for the determined location. The grid connection standards lookup table contains all the grid connection standards and the corresponding geographic regions that utilize each grid connection standard. In some embodiments, the grid connection standards lookup table is located within the handheld device. In other embodiments, the grid connection standards lookup table is stored on a device separated from the handheld device and the process 1100 queries the grid connection standards lookup table through a communication network.

Next, the process 1100 selects (at 1115) an inverter from the set of installed inverters. The process 1100 then sends (at 1120) the identified grid connection standard to the selected inverter in order to configure the inverter based on the grid connection standard. In some embodiments, the inverter stores the grid connection standard as a set of parameters in a non-volatile memory of the inverter and a controller configures the power converting component of the inverter based on that set of parameters. In some embodiments, the inverter loads a unique set of instructions for the grid connection standard for executing by a controller or processor of the inverter.

The process 1100 then determines (at 1125) whether there are more inverters need to be configured. When there are more inverters need to be configured, the process 1100 loops back to 1115 and selects another inverter from the set of inverters. When the process 1100 determines (at 1125) that there is no more inverter for configuration, the process 1100 terminates.

One of ordinary skill in the art will recognize that the process 1100 is a conceptual representation of the operations used to configure installed inverters through a handheld device. The specific operations of the process 1100 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1100 is performed by one or more software applications that execute on one or more computers. In some embodiments, the handheld device sends the identified grid connection standard to multiple inverters at the same time rather than sending it one by one. The process of some embodiments sends the determined location from the handheld device to the inverters and let each inverter to figure out the applicable grid connection standard.

IV. Grid Connection Standard

A grid connection standard includes a set of parameters that defines the regular behavior of a power grid and provides a guideline on the quality of power in the power grid. FIG. 12 illustrates an example of a set of parameters included in a grid connection standard. As illustrated in the figure, a grid connection standard 1200 includes parameters such as voltage 1205, voltage limits 1210, voltage unbalance 1215, voltage swell 1220, voltage sag 1225, voltage fluctuation 1230, transient overvoltage 1235, harmonics 1240, inter-harmonics 1245, high-order harmonic component 1250, frequency 1255, frequency fluctuation 1260, electrical noise 1265, interruption 1270, inrush current 1275, DC current injection 1280, disconnection time 1285, reconnection time 1290, power factor 1291, and power factor correction 1292.

A steady voltage 1205 is the voltage a customer can expect to receive under normal operating conditions. Since the loads on a power grid are constantly changing, it is impossible to maintain a completely constant voltage. Thus the voltage limits 1210 define a range, e.g., +5% and −8%, within which the deviation from the normal voltage 1205 should be in.

Voltage unbalance 1215 is generated by the increase or decrease of load connected to each phase, partial running equipment, voltage/current waveform distortion, voltage drop, or reverse phase voltage, etc. The phenomenon may cause revolution faults, an increase in noise, and less torque in a motor. Thus the voltage unbalance 1215 should be limited to, e.g., 3% or less.

Voltage swell 1220 is the instantaneous voltage increase caused by lightning strikes, opening or closing of a power supply circuit, high capacitor bank switching, ground short circuit, or cutting a heavy load, etc. It may also occur due to the grid connection of a new energy source (solar power, etc.). A sudden increase in voltage may damage or reset the power supply of equipment. Voltage sag 1225 is an instantaneous voltage drop caused by the cutting off of the power supply circuit due to a short circuit to the ground or high inrush current generation when starting a large motor, etc. The voltage sag 1225 may cause a stop or reset of equipment, turning off lighting, speed change or stop of motor, and synchronization error of synchronous motors or generators. Thus fast acting voltage regulators or power conditioners may be needed to protect sensitive equipment from the voltage swell 1220 and the voltage sag 1225.

Voltage fluctuation (flicker) 1230 is a periodically repeated voltage fluctuation caused by a furnace, arc welding or thyristor controlled load. It may cause lights to flicker and equipment to malfunction. Thus a limit may be placed to limit the frequency of occurrence for voltage fluctuation 1230.

Transient overvoltage (impulse) 1235 is the voltage change generated by a lightning strike, contact problem and closing of a circuit breaker/relay. It is often a rapid change and consists of high peak voltage. Damage to an equipment's power supply or reset function often occurs near the generation point due to its high voltage. Therefore, surge suppression equipment or other measures may need to be taken to protect against damage and malfunction due to transient overvoltage 1235.

Harmonics 1240 are generated by semiconductor control devices in the power supply of equipment as a result of distorted voltage and current waveforms. When the harmonic component is big, it may cause serious accidents such as overheating or noise in motors or transformers, burn out reactors in phase compensation capacitors, etc. Inter-harmonics 1245 are generated by a voltage/current waveform distortion caused by an electronic frequency converter, cycle converter, Scherbius system, inductive motor, welder or arc furnace, etc., and consists of non-integer orders of the fundamental frequency. Inter-harmonics 1245 may cause damage, malfunction or deterioration of equipment due to the zerocross shift of the voltage waveform. High-order harmonic component 1250 is a noise component higher than several kHz generated by the semiconductor control device in the power supply of equipment, and may contain various frequency components. High-order harmonic components 1250 may damage the power supply of equipment, reset equipment or introduce abnormal noise in equipment such as TVs or radios. Thus limitations, e.g., harmonic voltage limits and harmonic current distortion limits, may be imposed to protect against damage and malfunction due to harmonics 1240, inter-harmonics 1245, and high-order harmonic component 1250.

A power grid needs to maintain a normal frequency 1255 that should not vary more than a very small range, e.g., 0.05 Hertz from 60 Hertz. Frequency fluctuation 1260 occurs due to a change of effective power balance between supply and consumption, or an excessive increase or decrease of the load. Measures need to be taken to prevent frequency fluctuation 1260 in order to maintain a steady normal frequency 1255.

Electrical noise 1265 is unwanted electrical signals with broadband spectral content lower than 200 kHz superimposed upon the phase or neutral conductors or signal lines. Power electronic devices, control circuits, arcing equipment, loads with solid-state rectifiers, and switching power supplies can cause noise 1265 in power systems. Noise problems are often made worse by improper grounding. Thus measures such as employing proper grounding techniques and installing filters, isolation transformers, and line conditioners may need to be taken to mitigate the impact of electrical nose 1265.

Interruption 1270 is a power outage over an instantaneous, short or long period. It is caused by accidents such as lightning strikes or tripping of the circuit breaker because of a short circuit. Inrush current 1275 is an instantaneous high current flowing at the time equipment is powered on. Inrush current 1275 may cause relays to malfunction, circuit breakers to open, impact on the rectifier, unstable power supply voltage, and/or equipment to malfunction or rest. A grid connection standard may require taking remedial measures in dealing with interruption 1270 and inrush current 1275.

Single-phase voltage source inverters are used for connecting small-scale renewable energy sources to the low voltage distribution network. They operate to supply the network with sinusoidal current. If output transformers are not used, these inverters must prevent excessive DC current injection 1280, which may cause detrimental effects in the network. Therefore, a grid connection standard may contain requirements regarding DC current injection 1280.

The disconnection time 1285 specifies how fast the grid connection of an energy source (e.g., an inverter) needs to disconnect in the case of the grid going down in a number of milliseconds. The reconnection time 1290 specifies how fast, e.g., within how many seconds, the grid connection of the energy source needs to reconnect with the grid after disconnecting from the grid.

The power factor 1291 of an AC electrical power system is defined as the ratio of the real power flowing to the load to the apparent power in the circuit, and is a dimensionless number between 0 and 1. Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power will be greater than the real power.

Power factor correction 1292 brings the power factor of an AC power circuit closer to 1 by supplying reactive power of opposite sign, adding capacitors or inductors that act to cancel the inductive or capacitive effects of the load, respectively. The reactive elements can create voltage fluctuations and harmonic noise when switched on or off. They will supply or sink reactive power regardless of whether there is a corresponding load operating nearby, increasing the system's no-load losses. In the worst case, reactive elements can interact with the system and with each other to create resonant conditions, resulting in system instability and severe overvoltage fluctuations. As such, reactive elements cannot simply be applied without engineering analysis.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
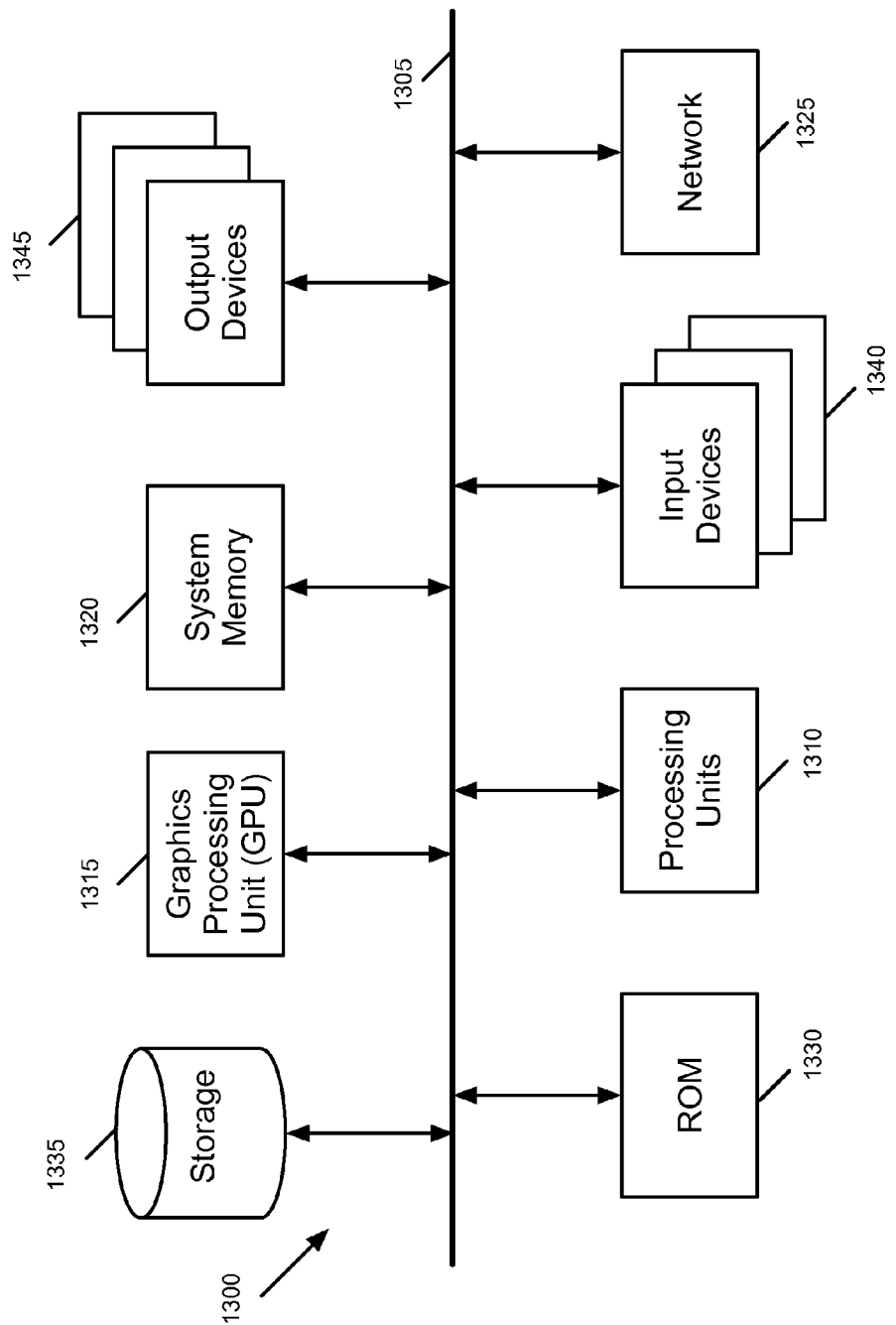
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1300 includes a bus 1305, processing unit(s) 1310, a graphics processing unit (GPU) 1315, a system memory 1320, a network 1325, a read-only memory (ROM) 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the GPU 1315, the system memory 1320, and the permanent storage device 1335.

From these various memory units, the processing unit(s) 1310 retrieves instructions to execute and data to process in order to execute the processes of the invention. The processing unit(s) may be a single processor or a multi-core processor in different embodiments. Some instructions are passed to and executed by the GPU 1315. The GPU 1315 can offload various computations or complement the image processing provided by the processing unit(s) 1310. The read-only-memory ROM 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash memory device, etc., and its corresponding disk drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor needs at runtime. In some embodiments, the invention's processes are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network (LAN), a wide area network (WAN), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, 7, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a program executable by at least one processor, the program comprising sets of instructions for:
   identifying a grid connection standard for an energy-harvesting device that has been installed in a physical installation; and
   configuring the energy-harvesting device to apply the identified grid connection standard.

2. The non-transitory machine readable medium of claim 1, wherein the program further comprises a set of instructions for determining a physical location for the physical installation, wherein the grid connection standard is identified based on the physical location.

3. The non-transitory machine readable medium of claim 2, wherein the set of instructions for determining the physical location comprises a set of instructions for receiving the physical location from a user input.

4. The non-transitory machine readable medium of claim 2, wherein the set of instructions for determining the physical location comprises a set of instructions for receiving the physical location from a handheld device located near the physical installation, the handheld device equipped with a global positioning system ("GPS") receiver, wherein the GPS receiver identifies the physical location.

5. The non-transitory machine readable medium of claim 2, wherein the set of instructions for determining the physical location comprises a set of instructions for identifying the physical location using a GPS receiver within the energy-harvesting device.

6. The non-transitory machine readable medium of claim 1, wherein the set of instructions for identifying the grid connection standard comprises a set of instructions for receiving the grid connection standard from a communication gateway connecting the energy-harvesting device to a communication network.

7. The non-transitory machine readable medium of claim 6, wherein the communication gateway identifies the grid connection standard based on a physical location determined by a set of parameters of the communication network.

8. The non-transitory machine readable medium of claim 1, wherein the set of instructions for identifying the grid connection standard comprises a set of instructions for receiving the grid connection standard from a handheld device located near the physical installation.

9. The non-transitory machine readable medium of claim 8, wherein the handheld device identifies the grid connection standard based on a physical location of the physical installation.

10. The non-transitory machine readable medium of claim 9, wherein the handheld device is equipped with a global positioning system ("GPS") receiver, wherein the physical location is determined by the GPS receiver.

11. The non-transitory machine readable medium of claim 9, wherein the physical location is determined by a user input.

12. An energy harvesting device comprising:
a power converter for converting DC power from a photovoltaic device to AC electricity; and
a controller for configuring, after the energy harvesting device has been installed at a physical location, the power converter based on a grid connection standard.

13. The energy harvesting device of claim 12 further comprising a global positioning system ("GPS") receiver for determining the physical location, wherein the controller is further for identifying the grid connection standard based on the physical location determined by the GPS receiver.

14. The energy harvesting device of claim 13, wherein the controller identifies the grid connection standard through searching a data structure containing information relating to a plurality of grid connection standards.

15. The energy harvesting device of claim 14, wherein the data structure is stored by the energy harvesting device.

16. The energy harvesting device of claim 14, wherein the data structure is stored by a device separate from the energy harvesting device.

17. The energy harvesting device of claim 12, wherein the controller receives the grid connection standard from a device separate from the energy harvesting device.

18. The energy harvesting device of claim 12 further comprising a communication module, wherein the controller uses the communication module for communicating with other devices in a communication network.

19. The energy harvesting device of claim 18, wherein the communication module comprises a wireless transceiver for transmitting and receiving wireless signals.

20. The energy harvesting device of claim 18, wherein the communication module performs power line communication.

21. The energy harvesting device of claim 12, wherein the controller comprises at least one processing unit.

22. A method comprising:
identifying a grid connection standard for a plurality of energy-harvesting devices that have been installed in a physical installation; and
applying the identified grid connection standard to the plurality of energy-harvesting devices.

23. The method of claim 22 further comprising determining a physical location for the physical installation, wherein the grid connection standard is identified based on the physical location.

24. The method of claim 23, wherein the physical location is determined based on a set of network connection parameters.

25. The method of claim 23, wherein the physical location is determined through receiving a user input.

26. The method of claim 23, wherein the physical location is determined using a global positioning system ("GPS") receiver.

27. The method of claim 23, wherein the grid connection standard is identified through searching a data structure based on the determined physical location, wherein the data structure contains information relating to a plurality of grid connection standards.

28. The method of claim 27, wherein the data structure is a grid connection standards lookup table.

29. The method of claim 22 further comprising transmitting the grid connection standard to the plurality of energy-harvesting devices.

* * * * *